United States Patent
Rasbornig et al.

(10) Patent No.: US 10,756,857 B2
(45) Date of Patent: Aug. 25, 2020

(54) METHOD, APPARATUS AND COMPUTER PROGRAM FOR DIGITAL TRANSMISSION OF MESSAGES

(71) Applicant: Infineon Technologies AG, Neubiberg (DE)

(72) Inventors: Friedrich Rasbornig, Klagenfurt (AT); Wolfgang Granig, Seeboden (AT); Bernhard Schaffer, Villach (AT); Wolfgang Scherr, Villach (AT); Michael Strasser, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1336 days.

(21) Appl. No.: 13/750,444

(22) Filed: Jan. 25, 2013

(65) Prior Publication Data
US 2014/0214970 A1    Jul. 31, 2014

(51) Int. Cl.
| | | |
|---|---|---|
| *H04L 1/22* | (2006.01) |
| *H04L 12/58* | (2006.01) |
| *H04L 12/40* | (2006.01) |
| *H04L 1/08* | (2006.01) |
| *H04B 1/16* | (2006.01) |

(52) U.S. Cl.
CPC ............. *H04L 1/22* (2013.01); *H04B 1/16* (2013.01); *H04L 1/08* (2013.01); *H04L 12/40* (2013.01); *H04L 12/4015* (2013.01); *H04L 51/30* (2013.01)

(58) Field of Classification Search
CPC .................... H04L 12/5855; H04L 1/1812
USPC .......................................... 709/206; 375/257
See application file for complete search history.

(56) References Cited

U.S. PATENT DOCUMENTS 5,166,664 A * 11/1992 Fish ................... G08B 25/10
                                                            340/505
5,828,850 A * 10/1998 Misaka ...................... 710/100
6,072,646 A *  6/2000 Ebata ................ G11B 20/1201
                                                            360/22

(Continued)

FOREIGN PATENT DOCUMENTS

CN          1909005 A      2/2007
CN        101499639 A      8/2009
(Continued)

OTHER PUBLICATIONS

Office Action dated Mar. 1, 2016 for Chinese Patent Application No. 201410034275.7.

(Continued)

*Primary Examiner* — Ramy M Osman
*Assistant Examiner* — Sm Z Islam
(74) *Attorney, Agent, or Firm* — Schiff Hardin LLP

(57) ABSTRACT

Embodiments relate to a controller operable to transmit digital data messages to a receiver via a communication link having at least a first and a second transmission path, the controller comprising a first signal terminal the first transmission path and a second signal terminal for the second transmission path. The first signal terminal is operable to digitally transmit a first message to the receiver according to a first transmission technique and the second signal terminal is being operable to digitally transmit a second message to the receiver according to a second, different transmission technique.

24 Claims, 4 Drawing Sheets

(56) References Cited

U.S. PATENT DOCUMENTS

| | | | |
|---|---|---|---|
| 6,493,401 B1* | 12/2002 | Erckert | B60R 16/0315 375/224 |
| 6,522,689 B1 | 2/2003 | Heinrich | |
| 7,295,578 B1* | 11/2007 | Lyle | G06F 3/14 348/473 |
| 7,589,431 B2* | 9/2009 | Hentsch | E05B 77/04 307/10.1 |
| 7,660,305 B1 | 2/2010 | Wiget et al. | |
| 8,503,501 B2* | 8/2013 | Saito | H04B 1/707 375/130 |
| 2001/0020281 A1* | 9/2001 | Retter | G05B 9/03 714/4.1 |
| 2002/0001225 A1 | 1/2002 | Poechmueller | |
| 2003/0026251 A1 | 2/2003 | Morris et al. | |
| 2003/0043750 A1* | 3/2003 | Remboski | H04L 45/00 370/242 |
| 2003/0095367 A1* | 5/2003 | Mares | G05D 1/0077 361/93.7 |
| 2004/0055370 A1 | 3/2004 | Normann et al. | |
| 2004/0120405 A1 | 6/2004 | Jaussi et al. | |
| 2005/0040709 A1* | 2/2005 | Enders | B60R 16/0315 307/10.1 |
| 2005/0267659 A1 | 12/2005 | Sunaga et al. | |
| 2006/0133601 A1* | 6/2006 | Ferianz | H04M 1/76 379/406.08 |
| 2006/0195018 A1* | 8/2006 | Guillen | 600/300 |
| 2007/0060394 A1* | 3/2007 | Gowin et al. | 463/47 |
| 2007/0160075 A1* | 7/2007 | Carpassi | H04L 12/40032 370/451 |
| 2008/0094317 A1* | 4/2008 | Kim | H01J 11/12 345/65 |
| 2008/0247544 A1 | 10/2008 | Candelore et al. | |
| 2008/0312860 A1* | 12/2008 | Bauerle | G01D 18/004 702/85 |
| 2009/0003464 A1* | 1/2009 | Matsubara | H04L 25/0272 375/257 |
| 2009/0046773 A1* | 2/2009 | Scherr | H04L 5/1484 375/238 |
| 2009/0144385 A1* | 6/2009 | Gold | G06Q 30/00 709/206 |
| 2009/0177827 A1* | 7/2009 | Perisich | G06F 13/24 710/262 |
| 2009/0216408 A1* | 8/2009 | Ueno | B60R 21/0132 701/45 |
| 2009/0315899 A1 | 12/2009 | Pourbigharaz et al. | |
| 2010/0002821 A1 | 1/2010 | Hammerschmidt | |
| 2010/0118887 A1* | 5/2010 | Matsumoto | H04L 12/403 370/465 |
| 2010/0199018 A1* | 8/2010 | Harada | G06F 11/0724 710/316 |
| 2012/0019354 A1* | 1/2012 | Saldin | H04L 63/1408 340/5.1 |
| 2012/0074972 A1 | 3/2012 | Rasbornig et al. | |
| 2012/0106976 A1* | 5/2012 | Bernard | H04J 3/0647 398/154 |
| 2012/0195400 A1* | 8/2012 | Tomar | H04L 7/0331 375/354 |
| 2013/0163995 A1 | 6/2013 | Uemura et al. | |
| 2013/0198422 A1 | 8/2013 | Subbiah et al. | |
| 2013/0287143 A1* | 10/2013 | Davies | H04L 1/08 375/316 |
| 2013/0344834 A1* | 12/2013 | Souto Diez | H03D 7/1441 455/245.1 |
| 2013/0345924 A1* | 12/2013 | Tomar | G01P 15/125 701/30.5 |
| 2014/0081120 A1 | 3/2014 | Valdastri et al. | |
| 2015/0180482 A1 | 6/2015 | Bourstein et al. | |

FOREIGN PATENT DOCUMENTS

| | | |
|---|---|---|
| CN | 101960767 A | 1/2011 |
| CN | 202275482 U | 6/2012 |
| CN | 102726032 A | 10/2012 |
| CN | 104937908 A | 9/2015 |
| DE | 10142408 A1 | 4/2003 |
| DE | 102007046440 B3 | 1/2009 |
| DE | 102008031498 A1 | 1/2010 |
| DE | 102009040911 A1 | 4/2010 |
| JP | H-0969843 A | 3/1997 |
| JP | H-10124407 A | 5/1998 |
| JP | 2002511212 A | 4/2002 |

OTHER PUBLICATIONS

Office Action dated Sep. 2, 2016 for Chinese Patent Application No. 201410034275.7.

Office Action dated Mar. 29, 2019 for Chinese Patent Application No. 201710728664.3.

Search Report dated Dec. 7, 2016 for French Patent Application No. 1400024.

Office Action dated Apr. 6, 2020 for German Patent Application No. 102013114355.5.

* cited by examiner

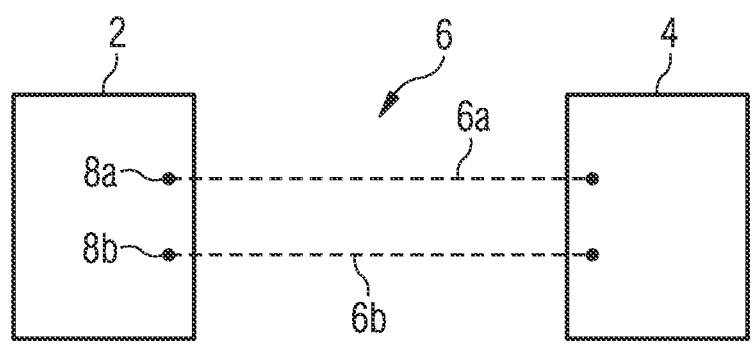
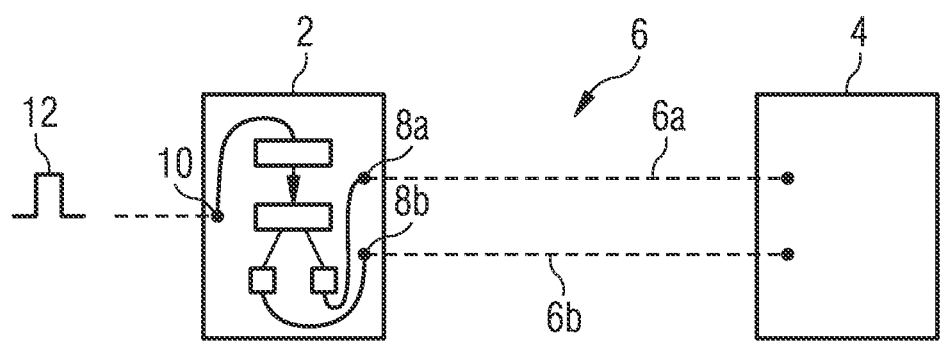

METHOD, APPARATUS AND COMPUTER PROGRAM FOR DIGITAL TRANSMISSION OF MESSAGES

TECHNICAL FIELD

Embodiments relate to transmission of digital data messages to a receiver via a communication link.

BACKGROUND

Content or messages are transmitted in numerous applications. For example, Ethernet or related techniques are used to transfer a large amount of data within the network of a company or via the internet. On a smaller scale, data is for example transmitted within vehicles, such as for example within an automobile in order to operate power windows or the like. Modern vehicles also utilize numerous sensors in order to monitor environmental conditions, i.e. physical quantities related to the operation of the vehicle or particular components thereof.

Failure of the transmission of digital data messages between a controller and a corresponding receiver via a communication link may result in a complete loss of the information intended to be transmitted. Moreover, in more complicated interrelated systems, a broken communication link may also result in the whole system becoming inoperable or becoming inefficient. Therefore, there is a desire to increase functional safety and reliability in the communication of data messages.

SUMMARY

According to exemplary embodiments, a controller operable to transmit digital data messages to a receiver via a communication link providing for at least a first and a second transmission path comprises a first signal terminal for the first transmission path and a second signal terminal for the second transmission path. The first signal terminal is operable to digitally transmit a first message to the receiver according to a first transmission technique while the second signal terminal is operable to digitally transmit a second message to the receiver according to a second different transmission technique. That is, the controller sends, to the same receiver, messages using two different transmission techniques at the same time or in parallel, wherein parallel transmission may also include scenarios where the first and second messages are sent with a predetermined time difference or one after the other. This may serve to increase functional safety by introducing redundancy into the transmission scheme. Functional safety may even be increased to a higher extent as compared to an approach where two independent identical communication links are redundantly used, since two different transmission techniques are utilized to communicate with the same receiver. For example, this may avoid that systematic errors cease transmission, which might occur at the same time in redundant systems relying on the same transmission technique.

According to exemplary embodiments, a content transmitted by the first and the second messages by the different transmission techniques is identical. This can serve to increase the reliability in that the content can still be transmitted or received to or by the receiver even when one of the transmission techniques encounters an error.

According to exemplary embodiments utilizing a data bus comprising at least a first bus line for the first transmission path and a second bus line for the second transmission path, the first transmission technique uses a variation of a voltage on the bus or on a first signal terminal connected to the bus in order to transmit the message while the second transmission technique uses a variation of a current on the second bus line or on a second signal terminal connected to the same. This can increase reliability of the transmission in scenarios, where external influences may distort voltages and, to a lesser extent, currents or vice-versa.

According to exemplary embodiments, a controller is operable to be used together with a data bus having at least a first bus line for digitally transmitting a first message, a second bus line for providing a reference potential and a third bus line for providing an operating voltage, that is in a system where the controller is powered by an operating voltage from the receiver and via the bus. A first signal terminal of the controller is connectable to the first bus line and operable to digitally transmit the first message according to the SPC (Short PWM Code) protocol, varying a voltage on the first signal terminal to transmit the message. A second signal terminal of the controller is connectable to the second bus line and operable to digitally transmit the second message to the receiver according to the SPC protocol, using a variation of a current on the second signal terminal to physically transmit the second message. A third terminal of the controller is connected to the third bus line providing the operating voltage. This can allow integration of a controller for transmitting data messages in a backwards-compatible manner into an existing system based on the SPC protocol. The functional safety can optionally be increased when the second transmission technique using a variation of a current is used. The same controller, however, can still be utilized with standard setups in already existing environments.

According to exemplary embodiments, a sensor system also comprises a sensor operable to provide a sensor signal indicative of a physical quantity sensed by said sensor, wherein the controller further comprises a sensor input terminal coupled to the sensor. The received sensor signal or the content provided by the sensor signal may then be transmitted via the two different transmission techniques. This can, in an inexpensive and efficient manner, increase the functional safety of systems relying on sensor data also in unfriendly environments, such as, for example, in automobiles.

Some embodiments comprise a digital control circuit installed within an apparatus for performing a transmission as illustrated above. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

BRIEF DESCRIPTION OF THE DRAWINGS

Some embodiments of apparatuses and/or methods will be described in the following by way of example only, and with reference to the accompanying figures, in which:

FIG. 1 shows an exemplary embodiment of a controller and a corresponding receiver capable of communicating together via a communication link.

FIG. 2 shows a further exemplary embodiment of a controller.

DETAILED DESCRIPTION

Figure 3:
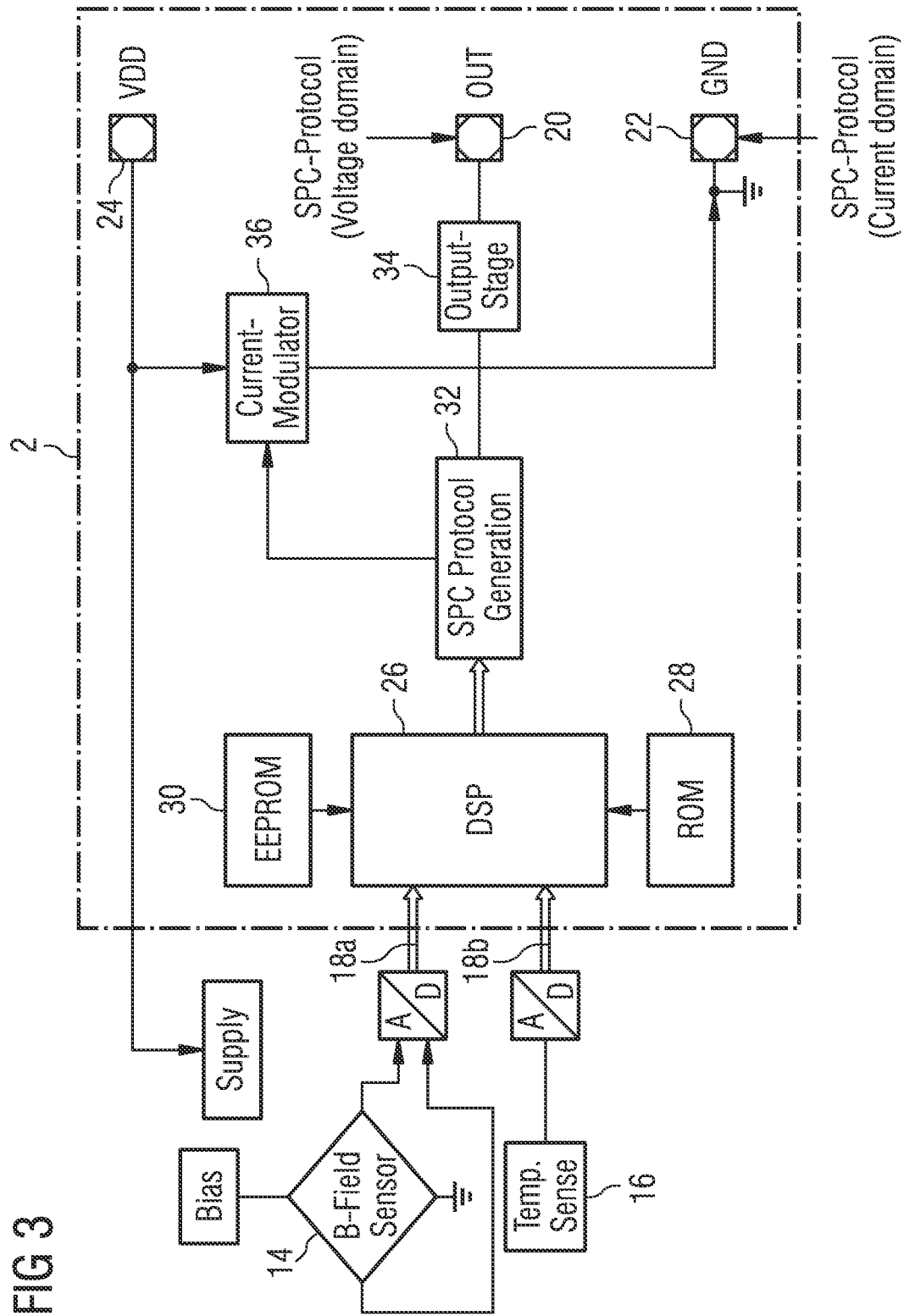
FIG. 3 shows an example for a sensor system incorporating an embodiment of a controller.

Various exemplary embodiments will now be described with reference to the accompanying drawings. In the figures, the thicknesses of lines, layers and/or regions may be exaggerated for clarity. It should be understood, however, that there is no intent to limit further embodiments to the particular forms disclosed, but on the contrary, further embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of further embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which the exemplary embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a schematic illustration of an exemplary embodiment of a controller 2 for transmitting digital data messages to a receiver 4 via a communication link 6, the communication link 6 having at least a first transmission path 6a and a second transmission path 6b. That is, the communication link 6 provides the possibility to transmit messages via two different transmission paths 6a and 6b. A communication link in that sense can be understood to be any physical coupling between the controller 2 and the corresponding receiver 4 which allows digital transmission of data messages from the controller 2 to the receiver 4. For example, this can be a wired data bus having two, three or any arbitrary larger number of bus lines in order to distribute or transmit currents or voltage pulses/levels or the like. Further examples for a communication link are one or more fibers in order to transmit optical signals or an air interface, i.e. a wireless connection, where different interface techniques can be incorporated as independent transmission techniques. An example for a wireless transmission technique can be one of the mobile communication systems or transceivers standardized by the 3rd Generation Partnership Project (3GPP), as Global System for Mobile Communications (GSM), Enhanced Data rates for GSM Evolution (EDGE), GSM EDGE Radio Access Network (GERAN), Universal Terrestrial Radio Access Network (UTRAN) or Evolved UTRAN (E-UTRAN), e.g. Universal Mobile Telecommunication System (UMTS), Long Term Evolution (LTE) or LTE-Advanced (LTE-A), or mobile communication systems with different standards, e.g. Multistandard Radio (MSR), Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Code Division Multiple Access (CDMA), Orthogonal Frequency Division Multiple Access (OFDMA), WirelessHART (IEC 6259) or any other technology with a multiplexing capable physical layer like Filter Bank Based Multicarrier (FBMC) systems. Of course, short range communication systems such as Bluetooth or ZigBee also can be used.

Since different techniques rely on different modulation and transmission schemes, they can be vulnerable to different kinds of distortions so that, even when one transmission technique fails to accomplish a transmission of a digital data message, the same can still be transmitted by the second transmission technique. When using, for example, a wired data bus having at least two bus lines, one bus line can be used to digitally transmit a first message to the receiver using a variation of a voltage on the bus line, while the second message can be transmitted using a varying current on the second bus line.

In order to provide the signals for the transmission over the first and second transmission paths 6a and 6b, the controller 2 comprises a first signal terminal 8a for the first transmission path 6a and a second signal terminal 8b for the second transmission path 6b. That is, the signals used to transmit the digital messages according to the first transmission technique and the second transmission technique are provided at the signal terminals 8a and 8b, respectively. Those can, for example, be directly connected to bus lines of a wired data bus or to antennas of a wireless communication system or the like.

According to one exemplary embodiment, content transmitted by the first and the second messages via the first and the second transmission paths 6a and 6b is identical so as to increase functional safety and reliability of the system since the content can still be received even when one of the transmission paths is disturbed or broken.

According to some embodiments, an order of bits used for a digital transmission of the content is different within the first message and the second message when the same content is transmitted by both messages. That is, the bit pattern to transmit the same content using the different transmission techniques can additionally be scrambled or modified in a predetermined manner so as to still increase the reliability of the system. For example, the individual bits of the second message can be the inverse of the bits of the first message. Even in the unlikely event that an error affects both transmission techniques in parallel and at the same time, there is still a chance to recover the content when different parts of the content are affected.

According to some exemplary embodiments, the length of a first sequence of bits used to transmit the content in the first message and of a second sequence of bits used to transmit the identical content in the second message is identical, wherein the bit value of each bit at a given position in the first sequence is the inverse of the bit value of the bit at the same position in the second sequence. That is, the first message can be the bit-wise inverse of the second message, which can provide for additional redundancies due to inter-related properties of a redundancy information such as, for example, a cyclic redundancy check value (CRC) which can be computed and appended to the first and second sequences of bits individually prior to their transmission.

According to some exemplary embodiments, at least one message of the group of the first message and the second message is transmitted using a serial transmission protocol using signals of varying width to represent digital content. To this end, a signal of varying width can be understood to be a pulse width modulated signal (PWM) where a digital quantity is represented by a fraction of a predetermined pulse length in which the signal is transmitted with a characteristic corresponding to one logical state, while the signal is transmitted with another characteristic corresponding to another logical state in the remaining time of the predetermined pulse length. To this end, the predetermined pulse length can be understood as a common clock time interval on which the protocol relies and which, therefore, should be available at the sender and at the receiver.

However, a signal of varying width shall generally be understood herein as any transmitted pulse shape or pulse formation in which a characteristic length or time can be varied so as to represent digital content. For example, two signal pulses of similar or identical shape which are transmitted with a varying time difference are also understood to be a signal of varying width. That is, the signal corresponds to the first pulse, the second pulse and the signal waveform between the pulses. The use of a transmission protocol using signals of varying width to represent digital content can permit use of simple and inexpensive devices due to the simplicity of the representation, which can furthermore provide for a high robustness with respect to a superposition of external noise signals and the like.

According to some exemplary embodiments, a common clock time interval for the transmission according to the serial transmission protocol is signaled from the controller to the receiver using a preamble to a content of a transmitted message, wherein a time difference between two signal pulses in the preamble corresponds to an integer multiple of the common clock time interval. That is, the common clock time interval is defined by the transmitter and provided to the receiver. This can provide an extremely high flexibility in systems design since the controller can collaborate with a wide range of receivers or chips receiving the transmitted messages due to the fact that the controller defines the clock cycles used within the protocol itself. Especially in sensor systems, where the sensors and associated controllers are typically provided with large structural sizes allowing for only moderate operating frequencies, this can permit combining sensors with nearly arbitrary receivers or control units having a receiver, without the need to provide receivers tailored to one particular sensor. U.S. Patent Application Publication Nos. 2009/046773A1 and 2010/002821 A1 disclose particular ways to use a preamble to provide a common clock time interval from the controller to the receiver. These documents are incorporated herein by reference in their entireties, and the provision of a common clock time interval as disclosed in those applications is expressly defined as a part of a particular exemplary embodiment.

According to some exemplary embodiments, a digital quantity is represented by two consecutive signal pulses transmitted with a time difference of a predetermined number of common clock time intervals, the predetermined number being related to the digital quantity. For example, the predetermined number of common clock time intervals between the two signal pulses directly equals a number to be transmitted using the serial transmission protocol. That is, if the number four is to be transmitted, the second signal pulse is sent four common clock time intervals after the first signal pulse. Each sequence of two signal pulses (which is a signal of varying width) representing a number or is also referred to as a nibble. With respect to one particular embodiment of a protocol to digitally transmit data using nibbles, reference is again made to U.S. Patent Application Publication Nos. 2009/046773A1 and 2010/002821 A1. The protocols described therein shall be understood to be part of one particular exemplary embodiment.

According to some embodiments, the serial transmission protocol associated with the first transmission technique is the SENT (Single Edge Nibble Transmission, SAE J2716 standard) protocol or the SPC protocol. According to further embodiments, only the second transmission technique uses one of these two protocols. According to yet further embodiments, both transmission techniques rely on the SPC or the SENT protocol or, more generally, on the same protocol. To this end, a protocol shall be understood to be a rule with respect to how digital data is mapped into symbols or bit sequences or generally into quantized information to be transmitted at a time by a transmission technique. It is important to note that, while the protocol can be the same for the transmission over both transmission paths, the transmission technique itself, i.e. the particular way the information is physically transmitted over the corresponding transmission medium, can be different. For example, a transmission technique in that sense can be equal to the physical layer of a typical protocol stack, while the SPC or SENT protocol or the logical protocol as referred to herein, shall be associated to one single or a combination of several higher layer protocols of the protocol stack. In that sense, digitally transmitting can be understood to prepare digital data for transmission according to one of those protocols, while the transmission via a physical layer itself according to a transmission technique can typically use analog signals or quantities. Of course, other exemplary embodiments can use different protocols, such as, for example, pulse width modulation (PWM), Peripheral Sensor Interface 5 (PSI5, as standardized and developed further by the PSI5 organization, http://psi5.org), Peripheral Acceleration Sensor protocol (PAS3/PAS4), Distributed Systems Interface (DSI, as standardized and developed further by the DSI Consortium, http://www.dsiconsortium.org). The individual protocols can be used to transmit one of the first message and the second message individually or to transmit both messages using the same protocol. It is additionally noted that arbitrary other protocols suitable to digitally transmit messages can be used in further exemplary embodiments which expressly also includes any future developments of those protocols.

Hence, data of the same protocol can, for example, be transmitted by a transmission technique relying on or being implemented in the voltage domain and, in parallel, by a second transmission technique relying on or being implemented in the current domain. That is, variations in voltage of a voltage level or voltage pulses can be used to transmit the first message according to the first transmission technique via signal terminal 6a, while, at the same time, variations of a current on the second signal terminal 6b can be used to transmit the second message according to the second transmission technique. This can be beneficial in that, for example, additional voltages can be induced in the bus lines in the presence of a magnetic field, while the current-based transport technique can be fairly robust with respect to the presence of magnetic fields.

FIG. 2 shows a further exemplary embodiment of a controller 2, operable to transmit digital data messages to the receiver 4 via the communication link 6. The controller 2 of the embodiment illustrated in FIG. 2 additionally comprises a sensor input terminal 10 for receiving a sensor input signal 12 which is indicative of a physical quantity sensed by a sensor. That is, the controller 2 illustrated in FIG. 2 is operable to be coupled to a sensor, such as to receive a sensor input signal indicative of a physical quantity sensed by a sensor and to transmit messages containing information on the sensor input signal to the corresponding receiver 4. This can, for example, be useful in automotive applications, where the sensor data serves to provide input to driving assistant systems, which in return means that a loss of sensor data may result in failure of the system and hence in an injury of a driver. To increase the functional safety, the sensor input signal 12 is first processed by a common part of a protocol stack in the controller 2. However, the transmission over the first and second transmission paths 6a and 6b is ultimately performed by two different transmission techniques in order to provide for the required functional safety of the system. To this end, the protocol stack implement in the controller 2 could be seen as a protocol stack having higher layers in common, while, at the same time, providing for two physical layer protocols or interfaces.

According to two further exemplary embodiments of controllers or sensor systems discussed with respect to FIGS. 3 and 4 in the following, the higher layers of the protocol stack or the transmission protocol can be the SPC-protocol, introduced to allow an efficient readout of sensor data in automotive applications via a simple three wired bus.

While SENT is a unidirectional communication standard where data from a sensor is transmitted autonomously without any intervention of the data receiving device, i.e. the receiver, SPC provides for the possibility of a half-duplex synchronous communication, where the receiver triggers a transmission. Generally, in SENT and SPC, a signal is transmitted from the controller or the sensor by a series of pulses, where the distance between consecutive falling edges of the associated pulses defines the transmitted data words. That is, the number of consecutive clock cycles (e.g. three microseconds) between two consecutive pulses corresponds to the transmitted symbol or data directly.

FIG. 3 shows an exemplary embodiment of a sensor system comprising a controller 2 and a magnetic-field sensor 14 as well as a temperature sensor 16. The controller 2, i.e. the sensor system of FIG. 3 is implemented to be compatible with a standard SPC-application, as it can be used in automotive applications to read out data of sensors. While the application in FIG. 3 shows a combination of a magnetic field sensor 14 and a temperature sensor 16 to be read out or to be controlled by the controller 2, further embodiments, of course, can also utilize different sensor types to sense or monitor different physical quantities. For example, a physical quantity sensed by a sensor can be a voltage, a current, a resistance, a pressure, a force, a position/location, a strain, a magnetic or electric field or the like. According to the embodiment illustrated in FIG. 3, the controller 2 comprises a first and a second sensor input terminal 18a and 18b, having connected thereto the sensors 14 and 16. In the particular embodiments of FIGS. 3 and 4, the sensor input signals are already converted from analog to digital so as to represent the physical quantity as sensed by the individual sensor by a digital representation or number. According to further embodiments, however, sensor-raw data can also be provided to the sensor input terminal, so as, for example, voltages or currents derived by the individual sensor elements directly. In those embodiments, the conversion of the sensor-raw data or signal into a digital representation can also be performed by the controller 2 itself.

Figure 4:
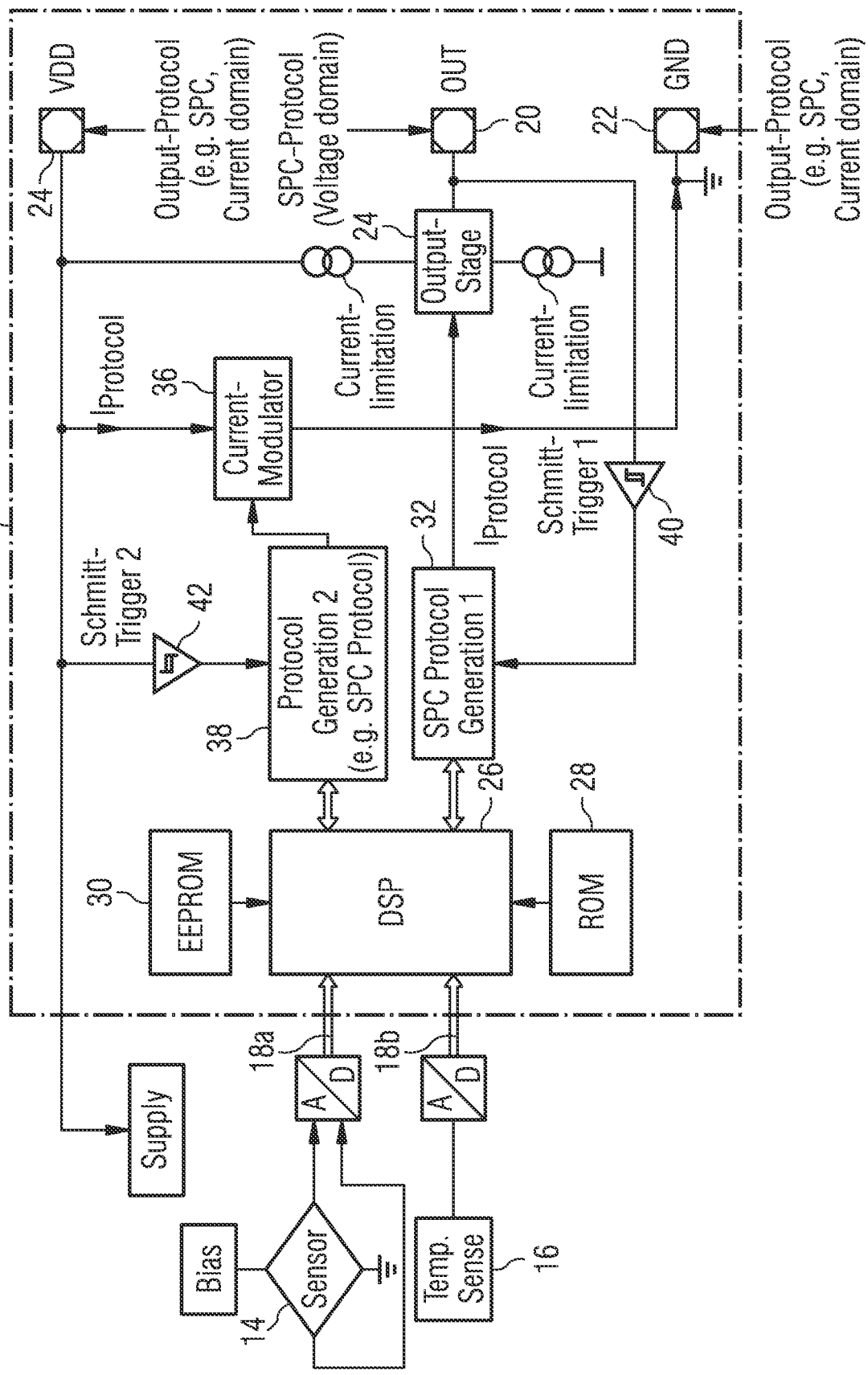
FIG. 4 shows an example of a sensor system incorporating an embodiment of a controller in a backwards-compatible manner.

As the controller 2 of FIGS. 3 and 4 is designed to be operable with SPC-compliant receivers, the controller comprises three signal terminals, a first signal terminal 20 for a first transmission path, a second signal terminal 22 for the provision of ground or, more generally, of a reference potential and a third signal terminal 24 for the provision of an operating voltage powering the controller and the associated sensors.

In this particular embodiment, the controller 2 comprises a digital signal processor (DSP) 26 having stored its associated program logic in read-only memory (ROM) 28, and having access to further data stored in an erasable EPROM (EEPROM) 30. While the read-only memory comprises data required for the operation of the DSP 26 itself, the EEPROM 30 can, for example, comprise additional data, such as, for example, calibration data for the sensors associated with the controller 2, serial numbers, manufacturer codes or the like.

The controller 2, in particular the DSP 26, receives, via the sensor input terminals 18a and 18b, sensor input signals indicative of the physical quantities sensed by the individual sensors.

The DSP 26 then provides a first and a second message, comprising information on at least one of the sensor signals of the sensors 14 or 16. That is, a representation of the content provided by the sensors 14 and 16, that is of the sensor signals, is transformed to appropriate messages or to an appropriate message format. The message, that is the digital representation of the content, is then transferred to an SPC protocol generator 32 which transfers the message into the transmission format as required by the SPC standard. The protocol generator 32 provides the message as ready for transmission according to the SPC protocol to a first transmitter 34 or output stage operating according to a first transmission technique, and, in parallel, to a second transmitter 36 or current modulator, operating according to a second, different transmission technique. In the particular example, the first transmitter operates in the voltage domain, i.e., the transmission technique relies on the variation of voltage levels on the bus line connected to the first terminal 20, as described in the specification of the SPC protocol. To this end, different voltage levels can be defined and the transition from one voltage level to the other voltage level indicates the start of a time measurement according to the SPC protocol.

In parallel, the second message is processed by the second transmitter 36, which is operating in the current domain. That is, the physical layer implementation differs from that of the first transmitter 34 in that the transitions between the different states of the SPC protocol are signaled by differing current levels. To this end, for example, a current level representing a logical "low" state can be defined to be one half of a current level associated to the logical "high" state. However, further embodiments may, of course, define other voltage and/or current levels to transmit or signal the transition between the different states.

In utilizing an embodiment of a controller 2 as illustrated in FIG. 3, one can use a standard, three wired SPC-bus and a corresponding receiver to read out or gather information from the sensors 14 and 16 associated to the controller 2.

Furthermore, the functional safety can be enhanced significantly in that the second transmitter 36 operates in parallel to the first transmitter 34, so as to be able to receive the required information on the sensor signals even if one of the transmission paths associated to the terminals 20 and 22 fails.

This can increase the functional safety without having to implement two completely separate sensor and transmitter systems, each making use of the same technology. Embodiments therefore can be not only cheaper than such an approach but also be safer with respect to critical operating conditions and environments. As already previously indicated, systematic errors in two identical implementations can be avoided when implementing systems according to which two transmission paths are used with different transmission techniques in order to transmit messages to the same receiver.

Although FIG. 3 illustrates an embodiment where the content of the first and second messages is identical, i.e., containing identical information about the sensor signals, further embodiments be also send different content by different messages via the different transmission paths.

FIG. 4 shows a further exemplary embodiment which is, partly, identical to the embodiment discussed with respect to FIG. 3. Therefore, only the additional components differing from the implementation of FIG. 3 will be discussed shortly. While the first and second transmitters 34 and 36 still operate in the current and the voltage domain, the embodiment of FIG. 4 provides for the possibility of transmitting either separate messages or further enhancing the robustness of the system by scrambling the message before submission of the same in order, for example, to avoid burst errors or the like. To this end, the embodiment of FIG. 4 additionally comprises a second protocol generator 38, which can be operated autonomously from the protocol generator 32 providing the SPC-protocol. The second protocol generator 38 can also implement the SPC protocol. According to further embodiments, however, the second protocol generator 38 can also provide for another protocol capable of being submitted in the current domain, as for example a Manchester-coded protocol.

Irrespective of whether the protocols used in the protocol generators 32 and 38 are identical or not, the embodiment of FIG. 4 provides for the possibility of scrambling the messages prior to the submission to avoid additional errors. The embodiment of FIG. 4 furthermore provides for the possibility of activating or deactivating each of the protocol generators 32 and 38 independently. That is, the controller 2 of FIG. 4 is operable to selectively work in a first operating mode using only the first transmission technique (the first transmitter 34) or in a second operating mode using only the second transmission technique (the second transmitter 36). To this end, a first Schmitt-trigger 40 is connected with its input to the first signal terminal 20 and with its output to a steering or control input of the protocol generator 32. A second Schmitt-trigger 42 is connected with its input to the third signal terminal 24 and with its output to a control input of the second protocol generator 38. That is, when a voltage above a first predetermined threshold associated to the first Schmidt-trigger 40 is applied to the first terminal 20 by the receiver or the control unit associated to the controller 2, the first protocol generator 32 can be switched in an operative state. Equivalently, upon occurrence of a voltage above a second predetermined threshold on the third signal terminal 24, the second protocol generator 38 can be put in an operational state. To this end, a user of the controller 2 of the sensor system of FIG. 4 can configure the controller and the transmission techniques as to his specific needs, while the controller 2 does at the same time provide backwards compatibility to standard SPC implementations.

Figure 5:
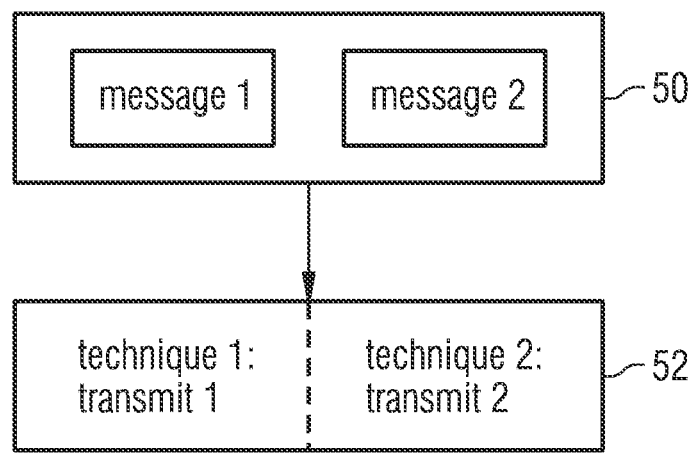
FIG. 5 shows a schematic illustration of an exemplary embodiment of a method for transmitting digital data messages.
Figure 6:
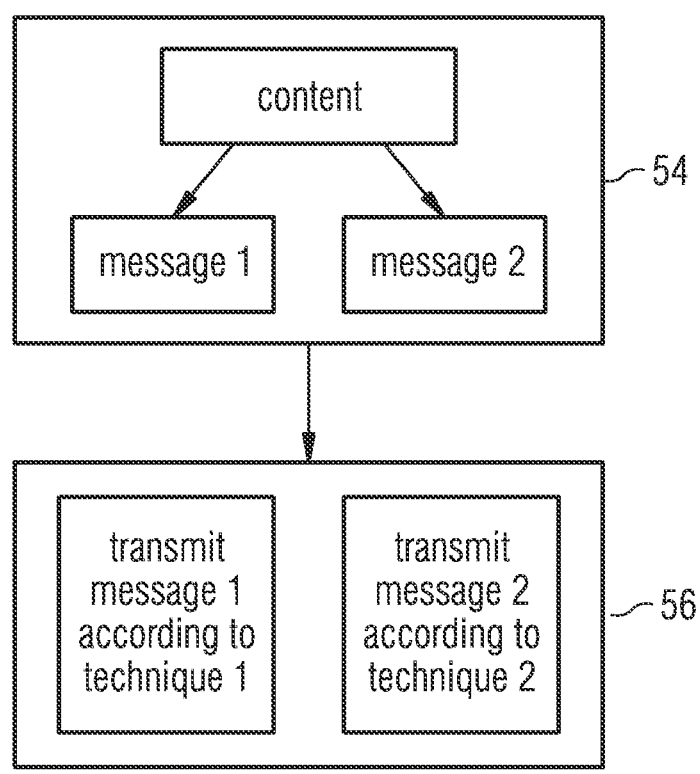
FIG. 6 shows a schematic sketch of a further exemplary embodiment of a method for transmitting digital data.

For the sake of completeness, FIGS. 5 and 6 illustrate schematically further exemplary embodiments of methods for transmitting digital data messages. FIG. 5 illustrates an exemplary embodiment of a method for transmitting digital data messages to a corresponding receiver via a communication link having at least a first and a second transmission path. In an optional provision step 50, first and second messages to be transmitted are provided.

To this end, it can be noted that the first and second messages can either be received from an external device, as for example illustrated in the embodiments of FIGS. 2 to 4 or, be created within the controller itself.

In a transmission step 52 the first message is digitally transmitted to the receiver via the first transmission path according to a first transmission technique. Furthermore, the transmission step comprises digitally transmitting the second message to the same receiver via the second transmission path according to a second transmission technique, the second transmission technique being different from the first transmission technique. Both transmissions may be performed in parallel or at the same time.

FIG. 6 schematically illustrates a further exemplary embodiment of a method for transmitting digital data to a corresponding receiver, according to which the same content is transmitted via two messages in order to provide for a redundancy increasing the functional safety of a system, as e.g. employed in automotive applications.

In a message creation step 54, a content to be transmitted is processed so that a first message is provided such that the first message comprises the content and a second message is provided such that also the second message comprises the content. Comprising the content in this respect means that the identical content can be reconstructed from either one of the messages according to a reconstruction rule. That is, both messages, when transmitted, transport the same information.

In a transmission step 56, the first message is transmitted according to the first transmission technique while the second message is transmitted according to the second transmission technique so as to allow for a redundant transmission and a possible reconstruction of the content even when one of the transmission techniques fails.

While exemplary embodiments have previously been described in particular with respect to sensor implementations, that is, for implementations where sensor data or sensor information is read out and transmitted by a controller, further embodiments can also utilize the concept described herein in other applications. For example, apart from automotive applications, functional safety can play a role in applications in the aircraft or space industry or the like. According to the previous considerations, the embodiments described herein or further alternative embodiments can, therefore, also be applied in other technical fields and areas, such as for example the aerospace industry.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted herein as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks labeled as "means," "means for," etc., may be provided through the use of dedicated hardware, such as "a processor," "a controller," etc. as well as hardware capable of executing software in association with appropriate software. Moreover, any entity described herein as "means," may correspond to or be implemented as "one or more modules," "one or more devices," "one or more units," etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A controller operable to transmit digital data messages to a receiver via a communication link having at least a first and a second transmission path, the controller comprising:
    a first signal terminal for the first transmission path, the first signal terminal being operable to digitally transmit a first message to the receiver according to a first transmission protocol; and
    a second signal terminal for the second transmission path, the second signal terminal being operable to digitally transmit, independently of the first message, a second message to the receiver according to a second, different transmission protocol,
    wherein the communication link comprises a data bus comprising at least a first bus line for the first transmission path and a second bus line for the second transmission path,
    wherein the second message is a redundant digital transmission of the first message,
    wherein the first transmission protocol modulates a voltage on the first signal terminal to transmit the first message, and
    wherein the second transmission protocol modulates a current on the second signal terminal to transmit the second message.

2. A controller according to claim 1, wherein at least one message of the first message and the second message is transmitted using a digital serial transmission protocol using signals of varying width to represent digital content.

3. A controller according to claim 2, wherein a digital quantity is represented by two consecutive signal pulses transmitted with a time difference of a predetermined number of common clock time intervals, the predetermined number being related to the digital quantity.

4. A controller according to claim 2, wherein a common clock time interval for the transmission according to the serial transmission protocol is signaled from the controller to the receiver using a preamble to a content of a transmitted message, and
    wherein a time difference between two signal pulses in the preamble corresponds to an integer multiple of the common clock time interval.

5. A controller according to claim 2, wherein the digital serial transmission protocol corresponds to the SPC (Short PWM Code) or the SENT (Single Edge Nibble Transmission) protocol.

6. A controller according to claim 5, wherein the first message and the second message are transmitted according to the SPC or the SENT protocol.

7. A controller according to claim 1, wherein a content transmitted by the first and the second messages is identical.

8. A controller according to claim 7, wherein an order of bits used to transmit the content in the first message is different than an order of bits used to transmit the identical content in the second message.

9. A controller according to claim 7, wherein the length of a first sequence of bits used to transmit the content in the first message and of a second sequence of bits used to transmit the identical content in the second message is identical, and
    wherein the bit value of each bit at a given position in the first sequence is the inverse of the bit value of the bit at the same position in the second sequence.

10. A controller according to claim 1, wherein the data bus comprises a third bus line for supplying an operating voltage to a third signal terminal of the controller, and wherein the second bus line serves to provide a reference potential for the operating voltage.

11. A controller according to claim 1, wherein the controller further comprises a sensor input terminal for receiving a sensor input signal indicative of a physical quantity sensed by a sensor.

12. A controller according to claim 1, wherein the controller is further operable to selectively work in a first operating mode using only the first transmission protocol or in a second operating mode using only the second transmission protocol.

13. A controller according to claim 12, wherein the controller is further operable to evaluate a signal condition on the first signal terminal and/or on a third signal terminal and to enter the first operating mode or the second operating mode upon occurrence of a predetermined condition on the first signal terminal and/or the third signal terminal, respectively.

14. A controller according to claim 13, wherein the predetermined condition is the exceeding of a predetermined voltage level on the first signal terminal and/or on the third signal terminal, respectively.

15. A controller according to claim 1, wherein the first transmission protocol includes scrambling a bit sequence pattern representing the first message, and
wherein the second transmission protocol includes scrambling a bit sequence pattern representing the second message.

16. A controller according to claim 15, wherein the first transmission protocol includes appending a cyclic redundancy check (CRC) value to the bit sequence pattern representing the first message prior to transmission via the first transmission path, and
wherein the second transmission protocol includes appending a cyclic redundancy check (CRC) value to the bit sequence pattern representing the second message prior to transmission via the second transmission path.

17. A controller operable to transmit digital data messages to a corresponding receiver via a data bus having at least a first bus line for digitally transmitting a first message, a second bus line for providing a reference potential and a third bus line for providing an operating voltage, the controller comprising:
a first signal terminal for the first bus line, the first signal terminal being operable to digitally transmit the first message to the receiver according to the Short PWM Code (SPC) protocol and a variation of a voltage on the first signal terminal to transmit the first message;
a second signal terminal for the second bus line, the second signal terminal being operable to digitally transmit a second message to the receiver according to the SPC protocol; and
a third signal terminal for the third bus line, wherein the second message is transmitted using a variation of a current between the second signal terminal and the third signal terminal.

18. A controller according to claim 17, wherein the controller is further operable to selectively work in a first operating mode using only the first signal terminal for transmission or in a second operating mode using only the second signal terminal for transmission.

19. A controller according to claim 17, wherein the controller further comprises a sensor input terminal for receiving a sensor input signal indicative of a physical quantity sensed by a sensor.

20. A sensor system, comprising:
a sensor operable to provide a sensor signal indicative of a physical quantity sensed by said sensor; and
a controller operable to transmit digital data messages to a corresponding receiver via a data bus having at least a first and a second bus line, the controller comprising:
a sensor input terminal coupled to the sensor, the sensor input terminal being operable to receive the sensor signal;
a first signal terminal for the first bus line, the first signal terminal being operable to digitally transmit a first message to the receiver according to a first transmission protocol, the first message comprising information on the sensor signal; and
a second signal terminal for the second bus line, the second signal terminal being operable to digitally transmit, independently of the first message, a second message to the receiver according to a second, different transmission protocol, the second message comprising information on the sensor signal,
wherein the second message is a redundant digital transmission of the first message,
wherein the first transmission protocol modulates a voltage on the first signal terminal to transmit the first message, and
wherein the second transmission protocol modulates a current on the second signal terminal to transmit the second message.

21. A method for transmitting digital data messages to a corresponding receiver via a communication link having at least a first and a second transmission path, the method comprising:
digitally transmitting a first message to the receiver via the first transmission path according to a first transmission protocol; and
digitally transmitting, independently of the first message, a second message to the receiver via the second transmission path according to a second transmission protocol, the second transmission protocol being different from the first transmission protocol,
wherein the communication link comprises a data bus comprising at least a first bus line for the first transmission path and a second bus line for the second transmission path,
wherein the second message is a redundant digital transmission of the first message,
wherein the first transmission protocol modulates a voltage on the first signal terminal coupled to the first transmission path to transmit the first message, and
wherein the second transmission protocol modulates a current on the second signal terminal coupled to the second transmission path to transmit the second message.

22. A method according to claim 21, wherein the first message is transmitted according to the Short PWM Code (SPC) or the Single Edge Nibble Transmission (SENT) protocol.

23. A method according to claim 21, further comprising:
receiving a content to be transmitted;
providing the first message such that the first message comprises the content; and
providing the second message such that the second message comprises the content.

24. A non-transitory computer readable medium storing a program code for performing a method for transmitting digital data messages to a corresponding receiver via a communication link having at least a first and a second transmission path, when the computer program is executed on a computer or processor, the method comprising:
digitally transmitting a first message to the receiver via the first transmission path according to a first transmission protocol; and
digitally transmitting, independently of the first message, a second message to the receiver via the second transmission path according to a second transmission protocol, the second transmission protocol being different from the first transmission protocol,
wherein the communication link comprises a data bus comprising at least a first bus line for the first transmission path and a second bus line for the second transmission path,
wherein the second message is a redundant digital transmission of the first message
wherein the first transmission protocol modulates a voltage on the first signal terminal coupled to the first transmission path to transmit the first message, and
wherein the second transmission protocol modulates a current on the second signal terminal coupled to the second transmission path to transmit the second message.

* * * * *